Figure 1:
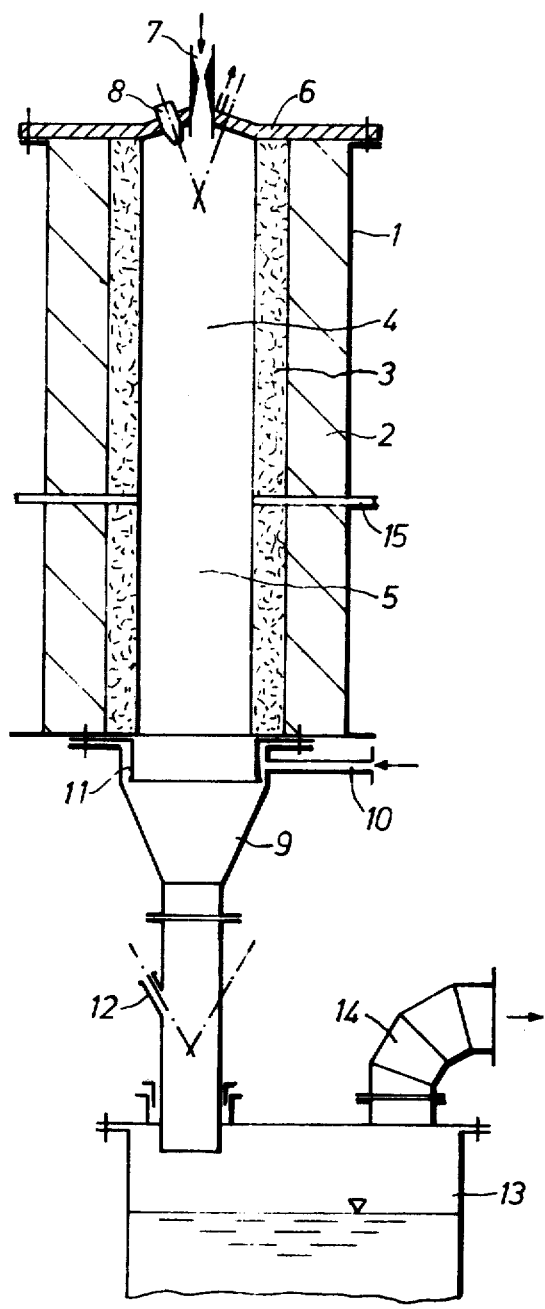

United States Patent [19]

Mansmann et al.

[11] 4,052,225
[45] Oct. 4, 1977

[54] PRODUCTION OF LOW-SULFUR CHROMIUM (III) OXIDE PIGMENT

[75] Inventors: Manfred Mansmann, Krefeld; Karl Brändle, Schildgen, both of Germany

[73] Assignee: Bayer Aktiengesellschaft, Leverkusen, Germany

[21] Appl. No.: 718,296

[22] Filed: Aug. 27, 1976

Related U.S. Application Data

[63] Continuation of Ser. No. 559,454, March 18, 1975, abandoned.

[30] Foreign Application Priority Data

Apr. 3, 1974 Germany .............................. 2416203

[51] Int. Cl.$^2$ .......................... C09C 1/34; C01G 37/02
[52] U.S. Cl. ...................................... 106/302; 423/607
[58] Field of Search ........................ 423/607; 106/302

[56] References Cited

U.S. PATENT DOCUMENTS

| 3,592,609 | 7/1971 | Honbo | 423/607 |
| 3,660,130 | 5/1972 | Buckley et al. | 106/302 |
| 3,723,611 | 3/1973 | Hahnkamm et al. | 423/607 |

FOREIGN PATENT DOCUMENTS

| 1,038,773 | 8/1966 | United Kingdom | 423/607 |
| 309,906 | 9/1971 | U.S.S.R. | 423/607 |
| 322,315 | 2/1972 | U.S.S.R. | 423/607 |

Primary Examiner—Herbert T. Carter
Attorney, Agent, or Firm—Burgess, Dinklage & Sprung

[57] ABSTRACT

In the continuous production of low-sulfur chromium-(III)oxide pigment comprising the steps of reducing a finely divided alkali metal chromate in a heated hydrogen-containing reaction zone at a temperature of about 900° to 1600° C, and precipitating the resulting chromium(III)oxide in the form of an aqueous dispersion, the improvement which comprises passing the reduction products from the reaction zone to a dwell zone and generating heat within said dwell zone to maintain the temperature therein in the range of about 900° to 1600° C. Preferably the dwell zone temperature is within 200° C of that in the reaction zone and is maintained by introducing excess hydrogen into the reaction zone and consuming it in the dwell zone by introduction of oxygen. The resulting pigments exhibit a fuller green color.

11 Claims, 1 Drawing Figure

PRODUCTION OF LOW-SULFUR CHROMIUM (III) OXIDE PIGMENT

This is a continuation of application Ser. No. 559,454, filed Mar. 18, 1975 now abandoned.

This invention relates to a process for the production of highly pure, low-sulfur chromium(III)oxide suitable for use as a pigment by reducing alkali metal chromates with hydrogen at elevated temperatures.

U.S. Pat. No. 3,723,611 relates to a process in which finely dispersed alkali metal chromates are reduced in a heated, hydrogen-containing reaction zone at temperatures in the range of from 900° to 1600° C, reduction optionally being carried out in the presence of a gas which binds the alkali metal ions to form salts during reduction of the alkali chromates, and the chromium-(III)oxide formed being separated off in the form of an alkaline dispersion. The alkali metal chromates are used either in the form of an aqueous solution or in the form of solid substances. Chlorine or hydrogen chloride is preferably used as the self-forming gas. The products obtained by this process have a sulfur content of less than 0.005% and an ignition loss of less than 1%. They show pigment properties. According to U.S. Pat. No. 3,723,611, heating is carried out by introducing and burning gases containing hydrogen and oxygen at the upper end of the reactor. The temperature is adjusted by varying the gas inputs. In another embodiment, the reactor is heated by introducing hot waste gases, for example from the combustion of natural gas with air outside the reactor, at the upper end of the reactor. In either case, the quantity of hydrogen stoichiometrically necessary for reducing the alkali chromates, plus an excess of approximately 10 to 20%, has to be present. The dimensions of the reactor are such that, below the reaction zone, there is a residence zone where any CrOOH formed can react to form $Cr_2O_3$ and the particle size can increase to from 0.1 to 10 microns.

Whereas the purity of chromium(III)oxide is of particular significance in the manufacture of chromium metal, a pure, full color is the prime requirement where chromium(III) oxide is used as a pigment. At the same time, any worthwhile pigment must have as high a coloring strength as possible. Although the product according to U.S. Pat. No. 3,723,611 are eminently suitable for the manufacture of chromium metal, their pigment properties are not altogether satisfactory insofar as, in terms of color, they are much more dirty than chromium oxide pigments produced by conventional processes, for example by reducing alkali chromates with sulfur.

Accordingly, the object of the present invention is to produce chromium(III)oxide pigments with pigment properties comparable with those of standard commercial chromium oxide pigments, without losing any of the advantages of the process disclosed in the aforementioned U.S. Pat., namely a low sulfur content of less than 0.005% in the chromium(III) oxide and continuous operation with high volume-time yields.

The present invention relates to a process for continuously producing low-sulfur chromium(III)oxide with improved pigment properties by reducing finely divided alkali metal chromates at temperatures in the range of about 900° to 1600° C, optionally in the presence of a gas which binds the alkali metal ions to form salts during reduction of the alkali metal chromates, the reaction zone being followed by a dwell zone, and separating the resulting chromium(III)oxide in the form of an aqueous dispersion, distinguished by the fact that temperatures in the range of about 900° to 1600° are set up in the dwell zone through additional, direct heating.

In the context of the invention, the reaction zone is the zone in which the alkali metal chromate is reduced to $Cr_2O_3$ or $CrO(OH)$ with the hydrogen introduced into the reduction zone. The dwell zone is the zone following the reaction zone in which any $CrO(OH)$ formed is reacted to form $Cr_2O_3$ and the particle size increases to around 0.1 to 10 $\mu m$.

The total energy input is advantageously divided in such a way that between about 30% and 80% is delivered to the reaction zone and between about 70% and 20% to the dwell zone. The temperature prevailing in the two zones do not have to be the same. The temperature prevailing in the dwell zone is preferably adjusted by additional, direct heating to the temperature prevailing in the reaction zone to such an extent that the temperatures in the two zones differ from one another by at most about 200° C.

In the absence of additional heating in the dwell zone, the temperature prevailing in that zone quickly falls below 900° C as a result of losses attributable to radiation and thermal conduction which are particularly severe in the preferred wet precipitation of the pigment.

All the heat required for the reaction is preferably supplied to the reaction zone and dwell zone by the combustion of hydrogen. It is particularly advantageous in this respect to introduce all the hydrogen at the upper end of the reactor and the oxygen-containing gases required for its combustion into the reaction zone and dwell zone in the specified ratios of about 30 to 80% and 70 to 20%, respectively. In this way, a large excess of hydrogen is obtained in the reaction zone, favorably affecting chromate reduction. It is particularly preferred to increase the quantity of oxygen introduced into the dwell zone to such an extent that it is at least sufficient for complete combustion of the hydrogen. In this way, an inert or oxidizing atmosphere is created both in the dwell zone and in the downstream parts of the apparatus, which also increases safety.

It is possible by the process according to the invention to obtain a pigment with the required, pure full color and high coloring strength, while at the same time the high yields of the process according to U.S. Pat. No. 3,723,611 remain intact. This factor is particularly surprising in cases where an oxidizing atmosphere prevails in the dwell zone on account of an excess of oxygen. It is only when, in an instance such as this, a salt-forming gas is not added that the conversion falls fairly drastically. For this reason, it is preferred to add a salt-forming gas when the oxygen is introduced into the dwell zone in a quantity at least sufficient for complete combustion of the hydrogen. In the process according to the invention, the sulfur content of the starting material, i.e., approximately 0.1% by weight, is reduced in the chromium(III)oxide obtained to less than 0.005% by weight, generally to even less than 0.002% by weight, irrespective of whether the product is precipitated in the form of an alkaline or acid suspension. Another advantage is that the chromium(III)oxides obtained by the process according to the invention have a particularly low alkali content and a very low ignition loss. Typical values are less than 0.2% by weight of sodium and an ignition loss of less than 0.4% by weight, preferably less than 0.2% by weight.

Both monochromates and also polychromates may be used as the alkali metal chromates. It is of advantage to use, for example, $Na_2Cr_2O_7 \cdot 2 H_2O$, $Na_2Cr_2O_7$, $Na_2CrO_4$, $K_2Cr_2O_7$ or $K_2CrO_4$. The starting materials should have a particle size in the range of about 10 to 500 μm.

It has proved to be advantageous to carry out reduction in the presence of a gas which reacts to form salts with the alkali metal hydroxides formed during reduction of the alkali metal chromates. In this way, the yield of the process, based on the alkali metal chromate used, can be considerably increased without affecting the low sulfur content in the chromium(III)oxide obtained. Whereas the conversions obtained in the process according to the afore-mentioned U.S. Pat. amount to just about 90% in the absence of a salt-forming gas and to more than 95% in the presence of such a gas, the conversions obtained in the process according to the invention in the absence of a salt-forming gas are to a greater or lesser extent below the comparable values of the known process, depending on whether an oxidizing or reducing atmosphere prevails in the dwell zone, but can be brought up to their level by the addition of a salt-forming gas.

It has also proved to be advantageous to add to the solid alkali metal chromate a small quantity of finely divided silicon dioxide of the kind formed, for example, in the vapor-phase hydrolysis of silicon tetrachloride, before it is introduced into the reaction zone. The finely divided silicon dioxide is preferably added in quantities of from about 0.1 to 2% by weight, based on the alkali metal chromate. This ends up in the product in about 0.2 to 3.5% by weight.

In one preferred embodiment, the process is carried out as follows: the alkali metal chromate is introduced into the reactor by means of a gas, pneumatically or in the form of a solution. The reaction zone of the reactor is directly heated, the temperature being regulated through the input of heating gases.

It is best to use an auxiliary gas, for example nitrogen, for pneumatic delivery of the starting material into the reactor. However, it is also possible to use the hydrogen required for reduction and/or heating for this purpose. Instead of pneumatically introducing an alkali metal chromate with a certain fineness, it is also possible to obtain uniform distribution of the alkali chromate over the cross-section of the reactor by starting with an aqueous solution of the corresponding alkali metal chromate and dispersing it through nozzles by means of a gas in such a way that the droplets formed are less than about 100 microns and, with advantage, between about 10 and 30 microns in size. In this case, the solution has a concentration of about 40 to 85% by weight.

Heating is carried out by burning hydrogen with gases containing oxygen, the temperature being regulated by varying the gas inputs. However, the quantity of hydrogen introduced must be such that at least the quantity stoichiometrically necessary for reduction is present in the reaction zone. The reactor can also be heated by hot waste gases emanating from combustion outside the reactor. These waste gases, of the type formed for example during the combustion of natural gas with air, are then introduced into the reactor. The excess of air required for complete combustion of the combustible gas outside the reactor is then burnt with hydrogen in the reactor itself.

The quantity of oxygen introduced into the dwell zone must be at least sufficient to maintain the required temperature in the dwell zone. It is best to use a slight excess of oxygen in relation to the hydrogen still present in the dwell zone.

In cases where the reactor is heated by the combustion of hydrogen, it is best to burn only a portion of the hydrogen in the reaction zone. Favorable conditions prevail when a proportion of about 30 to 80% of the hydrogen is burnt in the upper part of the reactor. The rest of the hydrogen is then available for combustion in the dwell zone.

In tests carried out with a view to improving pigment properties, it proved to be inadequate to carry out combustion of the hydrogen in two separate zones as long as an excess of hydrogen was maintained in the after-combustion zone as well and no salt-forming gas was added. It was only by adding a salt-forming gas, in conjunction with after-combustion being carried out under reducing conditions in the dwell zone, that it was possible to obtain the required improvements in the pigment properties. However, if oxygen is introduced into the dwell zone in such a quantity that the hydrogen is completely burnt, the improved pigments are obtained without any need to add a salt-forming gas. However, it is preferred even in this case to add a salt-forming gas.

The quantity in which this additional gas is used is best such that the quantity stoichiometrically necessary for binding the alkali hydroxide liberated during reduction is added. However, an excess, for example of 100% beyond that quantity, does not have any harmful effects. Examples of suitable salt-forming gases include chlorine, hydrogen chloride, bromine, hydrogen bromide, nitrogen monoxide, nitrogen dioxide or carbon dioxide. Chlorine is preferably used. The salt-forming gas when added can be present in up to about twice the molar amount required for salt formation with the alkali metal atoms of the alkali metal chromate, or even higher.

This gaseous salt former can be added to the reactor in any way, for example by previous admixture with the combustion air and/or with the combustion oxygen and/or with the hydrogen and/or with the gas used for pneumatic introduction of the akali metal chromate. However, the gaseous salt former can also be introduced into the reactor through nozzles provided specifically for that purpose.

Whereas, in cases where reduction is carried out in the absence of a salt-formig gas, the precipitation liquid becomes alkaline, the addition of a salt-forming gas in a quantity greater than the stoichiometrically necessary quantity can produce an acid reaction in the precipitation liquid. This is the case, for example, in the reduction of $Na_2Cr_2O_7$ with chlorine as salt-forming gas:

$$Na_2Cr_2O_7 + 3 H_2 \rightarrow Cr_2O_3 + 2 NaOH + 2 H_2O \qquad (1)$$

$$Na_2Cr_2O_7 + 4 H_2 + Cl_2 \rightarrow Cr_2O_3 + 2 NaCl + 4 H_2O$$

$$H_2 + Cl_2 \rightarrow 2 HCl \qquad (2)$$

In contrast with the process according to U.S. Pat. No. 3,723,611, the pH-value of the suspension does not have to be kept alkaline in the process according to the invention, because chromium(III)oxide with a very low sulfur content is also obtained from acid dispersion. In addition, the required pH-value can also be adjusted by adding acid or alkali in appropriate quantities to the pump-recirculated suspension.

The dimensions of the reactor should be such that, below the reaction zone, there is a reducing or oxidizing dwell zone in which the CrO(OH) partly formed during reduction is completely dehydrated to form $Cr_2O_3$, and the particle size grows to around 0.1 to 10 μm. The rate of gas flow in the reactor is best selected in such a way that the particles have an average residence time of about 0.1 to 10 seconds, advantageously about 0.4 to 4 seconds, approximately evenly divided between the reaction and dwell zones.

The $Cr_2O_3$ formed can be separated in any way, for example in cyclones. Below the reactor there is preferably a unit in which most of the $Cr_2O_3$ formed is wet-precipitated from the waste gas stream and, at the same time, the waste gas is brought to a temperature below 100° C. The dispersion of $Cr_2O_3$ in water initially formed may be used as the precipitation and cooling liquid. This dispersion can be continuously pump-recirculated through a condenser and returned to the separation and cooling unit. It has proved to be particularly advantageous to produce a film of liquid by spraying liquid or dispersion onto the wall of the cooling unit, as a result of which the temperature of the gas/solids mixture is reduced below 100° C and most of the solids present in the aqueous dispersion are precipitated.

The residual $Cr_2O_3$ left in the waste gas may be separated in a following washing tower. The concentrated dispersion is continuously pumped off to recover chromium oxide and replaced by corresponding quantities of fresh water.

The pigment properties of the chromium(III)oxide produced in accordance with the invention can be further improved by adding a small quantity of finely divided silicon dioxide, of the kind obtained for example by the flame hydrolysis of silicon tetrachloride, to the alkali metal chromate. Additions of as little as 0.1% by weight are positively reflected both in coloring strength and in color, the effect of the silicon dioxide becoming less positive when it is added in quantities of greater than 25% by weight. The silicon dioxide is preferably added in a quantity of about 0.25 to 1% by weight. Apart from improving pigment properties, the addition of silicon dioxide during the dosage of solid alkali metal chromates considerably improves the free-flow properties of the mixture, thus facilitating dosage.

One particular embodiment of the method according to the invention is described by way of example in the accompanying drawing wherein the FIGURE is a schematic sectional view through an apparatus for carrying out the process.

In the drawing the reference 1 denotes a steel cylinder, the reference 2 denotes an insulating layer, the reference 3 denotes a heat-resistant ceramic lining, the reference 4 denotes a reaction zone, the reference 5 denotes a dwell zone, the reference 6 denotes a cover with a cooling system, the reference 7 denotes an inlet pipe, the reference 8 denotes a burner, the reference 9 denotes a conically tapering pipe, the reference 10 denotes a weldedon pipe, the reference 11 denotes a coverplate, the reference 12 denotes nozzles, the reference 13 denotes a container, the reference 14 denotes a vent and the reference 15 denotes inlet pipes.

More particularly, the method according to the invention is carried out as follows:

The actual reduction stage taken place in the reaction zone 4. The reaction zone 4 is surrounded by a steel cylinder 1 comprising a layer 2 of insulating material and a ceramic lining 3. At its upper end, the reactor is closed by a cover, preferably made of fine steel, with a water cooling system 6. The pipe 7 extends centrally through the cover for introducing the alkali metal chromate. Individual burners 8 inclined relative to the vertical are arranged coaxially around this inlet pipe 7. Below the reactor there is a separation and cooling unit 9 which is conical in shape, tapering in the downward direction. Liquid or dispersion is pumped in through one or more tangentially arranged pipes 10. An encircling cover plate 11 prevents liquid from spraying onto the ceramic wall of the reactor. In the lower cylindrical section, individual nozzles 12 through which the liquid or dispersion can be sprayed are built in around the periphery. Waste gas and liquid or dispersion then enter the container 13 from which the waste gas is passed through the vent 14 into the washing tower.

The main difference in relation to U.S. Pat. No. 3,723,611 lies in the presence of a number of inlet pipes 15, for example for the introduction of oxygen-containing gas, such as air, oxygen-enriched air or even pure oxygen, allowing for example the post-combustion of some of the excess hydrogen from the upper part of the reactor. The position at which the inlet pipes 15 are arranged is best such that the additional, direct heating takes place after the hottest location in the upper zone, for example in the vicinity of or slightly below the middle of the reactor. By virtue of the fact that the excess hydrogen is burnt in the dwell zone 5, it is possible to regulate temperature to any required level in the dwell zone over a much longer section of the reactor.

The process according to the invention is illustrated in the following Examples. The tests to which these Examples relate were carried out in the apparatus already described with reference to the drawing.

EXAMPLES 1 to 11

A steel cylinder (external diameter 150 mm, length 1100 mm) was used as the reactor. Internally it contained an insulating layer of $Al_2O_3$-tamping compound (internal diameter 80 mm). The burner consisted of three coaxial quartz tubes. Through the inner tube, sodium dichromate was uniformly distributed over the cross-section by means of hydrogen and, in addition, nitrogen. The rest of the hydrogen was introduced through the middle tube, while oxygen and/or air was introduced through the outer tube. Chlorine was used as the salt-forming gas. The chlorine was then passed through the outer tube together with oxygen and/or air. The burner was fixed to the reaction tube with a water-cooled plug of VA-steel. 600 mm below the burner orifice there were four inlet pipes, staggered at 90° intervals, for post combustion. The reactor was joined at its lower end to a quartz tube around whose center were arranged 8 inlets through which aqueous suspension, which had been cooled beforehand in a condenser coil, was sprayed in for precipitating the $Cr_2O_3$ formed and for quenching the hot reaction gases. The temperature of the suspension was thus kept at about 50° to 60° C. Suspension and waste gas then flowed through a fine steel funnel into the glass washing section (diameter 100 mm). The suspension which had become concentrated during the test was able to flow out through a lower outlet into the storage container. The waste gases were passed through a glass packing, onto which the suspension was sprayed from above, and then discharged through a chimney.

Table 1 shows the reaction conditions in the tests carried out, while Table 2 shows the results of those tests. Table 3 shows the temperatures in the reaction and dwelling zones respectively and the SiO$_2$-content of the resulting products. For comparison, Examples 1 to 3 relate to tests conducted without post-combustion by the process disclosed in U.S. Pat. No. 3,723,611.

The operand $$w = \frac{\text{moles of } H_2 - (3 \cdot \text{moles of } Na_2Cr_2C_7) - \text{moles of } Cl_2}{2 \cdot \text{moles of } O_2}$$

is a measure of the performance of the reaction in relation to reducing or oxidizing conditions in the dwell zone. Where $w > 1$, there is an excess of hydrogen, while where $w < 1$ there is an excess of oxygen, based on the total input of oxidizing and reducing agent into the reactor.

Na$_2$Cr$_2$O$_7$ . 2 H$_2$O was used in Example 11, while Na$_2$Cr$_2$O$_7$ optionally admixed homogeneously with the specified quantity of finely divided silicon dioxide was used in the other examples. For working up, the suspension was filtered off, the filter cake resuspended in water, filtered and washed. The conversion was determined by titrating the unreacted quantity of Cr(VI) in the filtrate of the chromium(III)oxide suspension. The filter cake was dried for 16 hours at 120° C. The color was assessed by comparing lacquer coatings. A standard commercial chromium(III)oxide pigment was used as a comparison standard. Coloring strength was determined against the same standard in accordance with DIN 53 234.

It will be appreciated that the instant specification and examples are set forth by way of illustration and not limitation, and that various modifications and changes may be made without departing from the spirit and scope of the present invention.

What is claimed is:

1. In the continuous production of low-sulfur chromium(III)oxide pigment comprising the steps of reducing a finely divided alkali metal chromate in a heated hydrogen-containing reaction zone at a temperature of about 900° to 1600° C, and precipitating the resulting chromium(III)oxide in the form of an aqueous dispersion, the improvement which comprises introducing into said reaction zone a solid alkali metal chromate containing about 0.1 to 2% by weight of finely divided silicon dioxide, passing the reduction products from the reaction zone along with the silicon dioxide to a dwell zone, and generating heat within said dwell zone to maintain the temperature therein in the range of about 900° to 1600° C.

2. A process as claimed in claim 1, wherein the temperature within the dwell zone is within about 200° C of the temperature prevailing in the reaction zone.

3. A process as claimed in claim 2, wherein hydrogen is supplied to the reaction zone in about 10 to 20% in excess of the amount required to effect reduction of the chromium, there is also supplied to the reaction zone at least one salt-forming gas selected from the group consisting of chlorine, hydrogen chloride, bromine, hydrogen bromide, nitrogen monoxide, nitrogen dioxide and carbon dioxide, and oxygen is supplied to the reaction and dwell zones to generate heat therein, the amount of oxygen supplied to the reaction zone being less than that required for the complete combustion of the excess Table 1

| | | | | | Reaction conditions | | | | |
|---|---|---|---|---|---|---|---|---|---|
| Ex. No. | Na$_2$Cr$_2$O$_7$ moles/h | Chlorine moles/h | SiO$_2$ % | Precipitation | Nitrogen moles/h | Burner Hydrogen moles/h | Oxygen moles/h | Post-combustion oxygen moles/h | w |
| 1 | 3.1 | 6 | 0 | alkaline | 75 | 240 | 110 | 0 | 1.06 |
| 2 | 2.9 | 0 | 0.5 | " | 75 | 248 | 100 | 0 | 1.20 |
| 3 | 3.5 | 6 | 0.5 | " | 125 | 181 | 72 | 0 | 1.14 |
| 4 | 3.1 | 0 | 0 | " | 135 | 298 | 85 | 40 | 1.15 |
| 5 | 2.9 | 0 | 0.5 | " | 75 | 248 | 60 | 40 | 1.20 |
| 6 | 3.8 | 6 | 0 | acid | 75 | 249 | 57 | 67 | 0.93 |
| 7 | 2.5 | 0 | 0.5 | alkaline | 75 | 248 | 60 | 70 | 0.93 |
| 8 | 3.6 | 4 | 0.5 | acid | 75 | 252 | 60 | 40 | 1.19 |
| 9 | 3.2 | 6 | 0.5 | alkaline | 75 | 250 | 55 | 72 | 0.92 |
| 10 | 3.7 | 6 | 0.5 | acid | 75 | 249 | 57 | 67 | 0.94 |
| 11 | 3.8 | 6 | 0.5 | " | 65 | 279 | 72 | 74 | 0.90 |

Table 2

| Ex. No. | Conversion % | Results Relative coloring strength % | Pigment assessment: pure color of lacquer against standard |
|---|---|---|---|
| 1 | 96 | 108 | dark, dirty green |
| 2 | 87 | 67 | green with heavy tinges of brown |
| 3 | 94 | 92 | pale green with grey-blue tinges |
| 4 | 83.5 | 63 | green with heavy tinges of brown |
| 5 | 79 | 68 | dark, dirty green |
| 6 | 89 | 93 | much fuller green |
| 7 | 58 | 97 | distinctly fuller green |
| 8 | 99 | 99 | less pale green with more tinges of blue |
| 9 | 95 | 109 | traces of fuller green |
| 10 | 97 | 104 | fuller green |
| 11 | 93 | 97 | fuller green with traces of blue tinges |

Table 3:

| Ex. No. | Temperature Reaction zone | Temperature Dwell zone | SiO$_2$-content of the product |
|---|---|---|---|
| 1 | 1380° C | 870° C | 0. % |
| 2 | 1290° C | 850° C | 1.0 % |
| 3 | 1040° C | 740° C | 0.9 % |
| 4 | 1380° C | 1230° C | 0 % |
| 5 | 1220° C | 1150° C | 1.1 % |
| 6 | 1360° C | 1400° C | 0 % |
| 7 | 1390° C | 1420° C | 1.5 % |
| 8 | 1250° C | 1180° C | 0.9 % |
| 9 | 1350° C | 1430° C | 0.9 % |
| 10 | 1360° C | 1360° C | 0.9 % |
| 11 | 1420° C | 1460° C | 1.1 % | hydrogen, about 30 to 80% of the total amount of oxygen supplied to the reaction and dwell zones being supplied to the reaction zone and about 70 to 20% being supplied to the dwell zone.

4. A process as claimed in claim 1, wherein hydrogen is supplied to the reaction zone in excess of the amount required to effect reduction of the chromium in the alkali metal chromate to chromium (III), and oxygen is also supplied to the reaction zone to combine with the hydrogen to supply heat, the amount of oxygen supplied being less than that required for the complete combustion of the excess hydrogen.

5. A process as claimed in claim 4, wherein the temperature is maintained in said dwell zone by introducing oxygen into the dwell zone for combustion of hydrogen.

6. A process as claimed in claim 1, wherein the hydrogen is supplied to the reaction zone in about 10 to 20% in excess of the amount required to effect reduction of the chromium.

7. A process as claimed in claim 1, wherein about 30 to 80% of the total amount of oxygen supplied to the reaction and dwell zones is supplied to the reaction zone and about 70 to 20% is supplied to the dwell zone.

8. A process as claimed in claim 1, wherein the amount of oxygen introduced into the dwell zone is at least sufficient for the complete combustion of the hydrogen.

9. A process as claimed in claim 1, including supplying to the reaction zone at least one salt-forming gas selected from the group consisting of chlorine, hydrogen chloride, bromine, hydrogen bromide, nitrogen monoxide, nitrogen dioxide and carbon dioxide.

10. A process as claimed in claim 1, wherein hydrogen is supplied to the reaction zone for reduction and heat generation, wherein a salt forming gas is added and wherein oxygen is added in such an amount sufficient for the combustion of the hydrogen and in such an amount that at least an inert or oxidizing atmosphere can be maintained in the parts arranged behind the reactor.

11. A process as claimed in claim 10, wherein the oxygen excess is up to about 25%.

* * * * *